United States Patent [19]
Norris
[11] Patent Number: 4,847,632
[45] Date of Patent: Jul. 11, 1989

[54] PRINTER APPARATUS HAVING FOLDABLE CATCHER ASSEMBLY

[75] Inventor: Philip R. Norris, North Reading, Mass.
[73] Assignee: Polaroid Corporation, Cambridge, Mass.

[21] Appl. No.: 201,844
[22] Filed: Jun. 3, 1988
[51] Int. Cl.⁴ .............. G01D 15/00
[52] U.S. Cl. .............. 346/107 R; 355/21
[58] Field of Search .............. 346/150, 107 R, 108, 346/160; 400/718; 355/3 SH, 14 SH, 21, 72

[56] References Cited

U.S. PATENT DOCUMENTS

| | | | |
|---|---|---|---|
| 2,467,320 | 4/1949 | Land | 346/167 R |
| 3,350,990 | 11/1967 | Finelli et al. | 346/107 R |
| 3,405,619 | 10/1968 | Land | 346/107 R |
| 3,653,308 | 4/1972 | Erlichman | 346/107 R |
| 3,672,663 | 6/1972 | Tomlinson | 346/107 R |
| 3,675,551 | 7/1972 | Land et al. | 346/107 R |
| 3,748,990 | 7/1973 | Erlichman | 346/107 R |
| 3,762,252 | 10/1973 | Hujer et al. | 346/107 R |
| 3,799,539 | 3/1974 | Humberto et al. | 271/188 |
| 3,807,726 | 4/1974 | Hope et al. | 271/209 |
| 3,912,389 | 10/1975 | Miyamoto | 355/3 SH |
| 3,997,265 | 12/1976 | Menon et al. | 355/3 SH |
| 4,184,764 | 1/1980 | Bailey et al. | 355/3 SH |
| 4,245,824 | 1/1981 | Rymarchyk | 266/287 |
| 4,405,125 | 9/1983 | Kulpa | 346/107 R |
| 4,424,963 | 1/1984 | Martholet et al. | 270/107 R |
| 4,450,918 | 5/1984 | Danford | 172/583 |
| 4,456,362 | 6/1984 | Masaki et al. | 355/3 SH |
| 4,508,440 | 4/1985 | Costa et al. | 354/187 |
| 4,542,967 | 9/1985 | Costa et al. | 354/187 |
| 4,575,069 | 3/1986 | Burkhart | 271/186 |
| 4,593,983 | 6/1986 | Launie | 354/217 |
| 4,630,128 | 12/1986 | Gokita | 358/296 |
| 4,662,626 | 5/1987 | Shores | 271/305 |
| 4,673,956 | 6/1987 | Kobayashi | 346/160 |
| 4,768,063 | 8/1988 | Kunishima | 355/3 SH |

*Primary Examiner*—Arthur G. Evans
*Attorney, Agent, or Firm*—Leslie J. Payne; Edward S. Roman

[57] ABSTRACT

There is disclosed an electronic printing apparatus which prints images on successive individual film units. The apparatus includes a foldable film catcher assembly which moves automatically from a compact inoperative condition to an extended operative condition upon emergence of a film unit from the apparatus. The catcher assembly removably supports the film units in a stacked manner so that selected ones of the units can be removed. The catcher assembly is easily returned to the compact condition by an overcenter spring.

7 Claims, 4 Drawing Sheets

PRINTER APPARATUS HAVING FOLDABLE CATCHER ASSEMBLY

BACKGROUND OF THE INVENTION

The present invention is related to an electronic printing apparatus and, more particularly, to a printing apparatus which includes a collapsible/extensible catcher device for presenting image recording units to a user following ejection of them from the apparatus.

The present invention is related to an improvement of the type of electronic printer described more fully in copending and commonly assigned application Ser. No. 188,265, filed Apr. 29, 1988 and entitled "ELECTRONIC PRINTING APPARATUS HAVING REVERSING MECHANISM" by Philip R. Norris. The printer described in that application prints images on successive ones of a plurality of photosensitive film units of the self-developing type, manufactured by Polaroid Corporation. In the printing operation of said printer, beams of light are scanned across the width of each photographic unit as the unit is advanced towards a printing station. At the printing station, a conventional kind of self-developing film processing system is positioned. The film processing system is generally of the kind employed in photographic cameras of the self-developing type which is usable with the above noted kinds of films. Essentially, such a processing system employs a pair of pressure driving rollers which are actuated to grasp the leading edge of a film unit that is being picked from a film cassette therefor. The driving rollers, in effect, eject the film units from the cassette after initiating the diffusion transfer process.

From a user standpoint, it is highly desirable that such a printer present successive film units in a manner, whereby the user may either temporarily store or withdraw selected dispensed film units. Moreover, it is further desirable that an arrangement for providing such options occupy a minimum of space and yet be simple, effective and low in cost.

There are several known approaches for storing such film units after being immediately ejected from film processing systems of the above-noted type. Exemplary storage systems of this type are generally associated with photographic cameras of the instant-developing type.

For instance, commonly assigned U.S. Pat. No. 2,467,320 describes a camera wherein exposed film units exit the camera and are transferred into a chamber of a storage member that is pivotally attached to the exterior of the camera. However, the pivotal arrangement adds significantly to the fixed camera volume. Furthermore, manipulation of the camera and pivotal chamber is necessary for effecting film storage and retrieval. Moreover, the camera is not versatile enough to simultaneously store and automatically present the film units to a user.

Also, cameras of the self-developing type have been proposed wherein there is provided a variable volume chamber that is integral with the camera and which is adapted to receive exiting film units. For example, commonly assigned U.S. Pat. Nos. 3,653,308 and 3,748,990 describe lighttight film processing chambers whose volumes vary to receive film units exiting the film rollers of the camera. These chambers automatically retract to a storage position after receiving the ejected film unit. These arrangements aren't as versatile as desired since they don't present film units to a user immediately upon exiting the camera and they don't allow the film units to be stored in a manner which is not only simple and reliable, but which maintains the film units in a convenient presenting orientation for user withdrawal.

While there exists a number of printer devices which include trays for receiving individual sheets or units of printed matter, none are known which are highly compactible when not in use and automatically and easily extensible to receive a stack of film units exiting a printer or the like in a manner which facilitates greatly their storage for and/or presentation to a user.

SUMMARY OF THE INVENTION

In accordance with the principles of the present invention there is provided an improved image recording apparatus. Included in the apparatus is a housing assembly having an exit slot and having disposed therein means for ejecting individual image recording units from the exit slot.

In an illustrated embodiment, provision is made for a foldable image recording unit catcher assembly mounted on and exterior to the housing assembly adjacent the exit slot for automatically moving from a compact inoperative condition to an extended operative condition in response to ejection of an initial image recording unit from the slot. In the operative position, the assembly removably supports a plurality of exited recording units and presents them to a user in a preselected orientation which facilitates removal of selected ones of the units.

In this illustrated embodiment, the foldable catcher assembly comprises at least a supporting member, a linkage assembly which joins the supporting member to the housing assembly so as to allow pivoting movement of the supporting member and linkage assembly between collapsed and extended conditions. The biasing means comprises an overcenter spring which can selectively bias the supporting member to either the inoperative or operative conditions. In the inoperative condition the supporting member is in covering juxtaposed relationship to the exit slot. Upon emergence of an exiting unit, the supporting member is engaged by and moved to its extended condition, whereat the film unit is supported thereon after clearing the exit slot. Successive ejected film units are allowed to stack-up on the supporting member. There is provided limit means which limits movement of the supporting member and the linkage assembly to a preselected orientation. For returning the supporting member to the compact and collapsed condition, a user need merely push the supporting member beyond an overcenter position after removing the film units. The biasing of an overcenter spring urges the supporting member and linkage assembly to their initial collapsed condition.

Among the objects of this invention are, therefore, the provision of an improved electronic image printer apparatus having a foldable film catcher assembly for removably receiving exiting image recording units which can be stored and presented to a user in a reliable and simple manner; the provision of an improved assembly of the foregoing type wherein it becomes operative automatically in response to engagement by an exiting image recording unit; the provision of an improved assembly of the foregoing type which when in the inoperative position is in a collapsed and compact condition and which does not add significantly to the volume of the printer.

These and other objects, features and the invention itself will become apparent from the following description when taken in conjunction with the accompanying drawings wherein like structure throughout the several views are indicated by like reference numerals.

DETAILED DESCRIPTION

Figure 1:
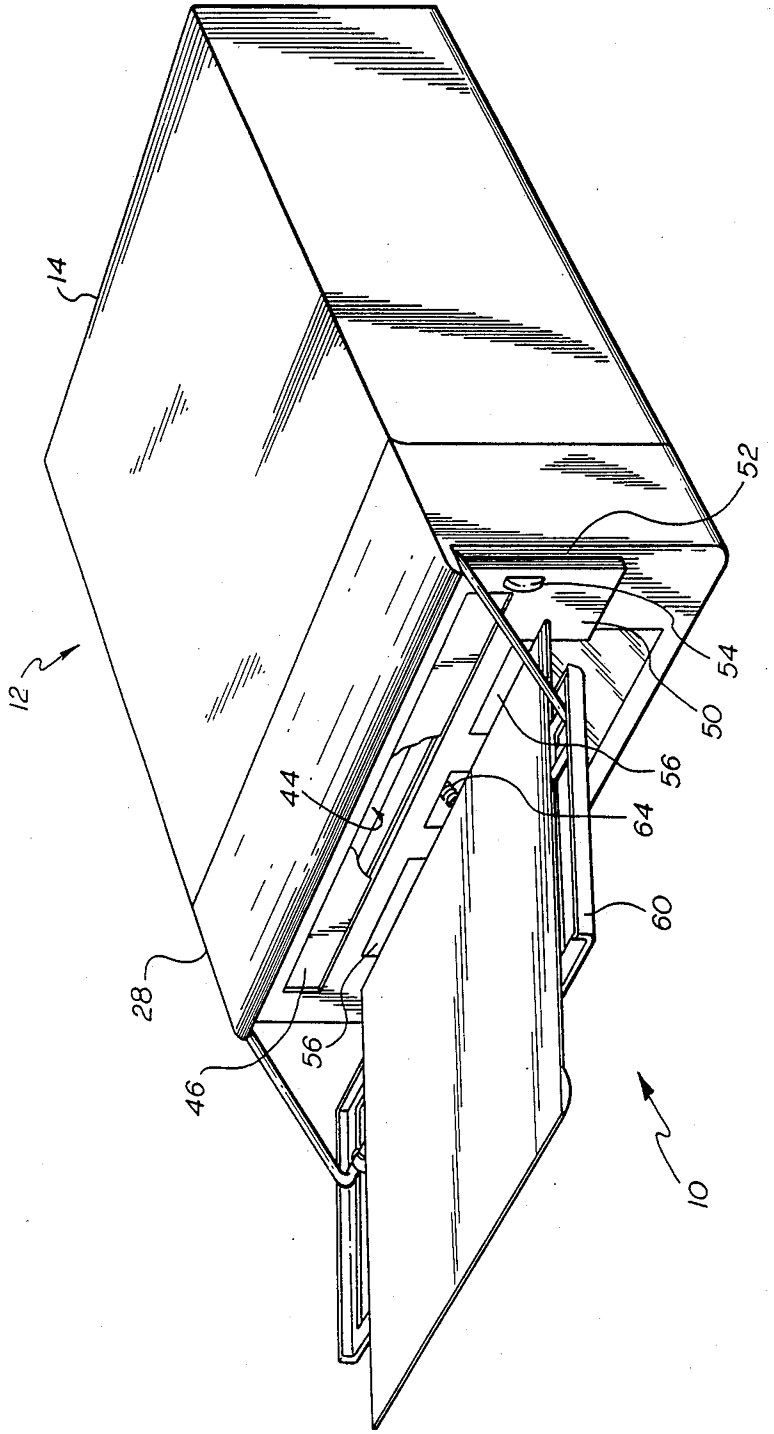
FIG. 1 is a perspective view of an electronic image printing apparatus of the present invention showing an embodiment of a foldable catcher assembly in an extended condition.

Reference is made to FIGS. 1–4 for showing a preferred embodiment of a foldable film catcher assembly or device 10 of the present invention. The film catcher assembly 10 is adapted for use with an electronic printer of the kind described more completely in copending and commonly assigned application Ser. No. 188,265, filed Apr. 29, 1988 and entitled "ELECTRONIC IMAGE PRINTING APPARATUS HAVING REVERSING MECHANISM." Since the printer 12 does not by itself form an aspect of the present invention only those details thereof deemed necessary for an understanding of this invention will be set forth. While the foldable film catcher assembly is shown for use in conjunction with an electronic printer, it will be apparent that the device can be used in conjunction with other apparatus such as self-developing cameras of the type which eject film units or the like from an exit slot in the apparatus.

The printer 12 includes a housing assembly 14 which removably receives a film cassette 16 holding a stack of film units 18 of the instant developing type. Both the film cassette 16 and film units 18 can be of the well-known instant developing type manufactured by Polaroid Corporation. When the film cassette 16 is in its film processing position, see FIG. 4, the bottommost and exposed film unit of the stack is to be ejected from the cassette and the printer. Ejection is accomplished by actuation of a film picking mechanism (not shown) in the printer 12 and a pair of conventional processing rollers 20, 22 of a processing roller assembly 24 shown partially in FIG. 2. The path to be taken by an exiting film unit 18 is indicated by the dashed lines in FIG. 4.

The processing roller assembly 24 (FIG. 2) includes a pair of mounting brackets 26 mounted in the pivotal front loading door 28 of the housing assembly 14. The processing rollers 22, 24 are rotatably supported in the mounting brackets 26. Spring members 30 are attached to the bracket 26 and urge the topmost processing roller 20 toward the bottom one.

It will be appreciated that a predetermined gap exists between the processing rollers 20 and 22 so that when the film units are withdrawn therepast, they effect commencement of a diffusion transfer process which is well-known in the instant developing film art. For driving the processing rollers 20, 22 a driving gear 32 is attached to an end of a shaft upon which is mounted the processing roller 22. Another gear (not shown) is driven by a motor (not shown) and is operable for imparting rotation to the driving gear 32 as well as is effective for driving a film picking mechanism (not shown). The film picking mechanism effectively engages each of the bottommost film units and causes them to emerge from the cassette 16 as is described more fully in the last noted application.

For insuring that the emerging film units are kicked clear of the front loading door 28, there is provided a film unit transfer mechanism 34. Included in the transfer mechanism 34 is a film transfer drive gear 38 which meshes with the driving gear 32. The transfer drive gear 38 is affixed to one end of a drive shaft 40 which is rotatably mounted in the brackets 26. A pair of friction type film transfer wheels 42 is mounted for rotation on the drive shaft 40 and each is spaced apart by a distance which is predetermined to insure that each engages a respective opposite longitudinal edge of each emerging film unit. The transfer mechanism 34 and the roller assembly 24 define means for ejecting the film units.

Figure 2:
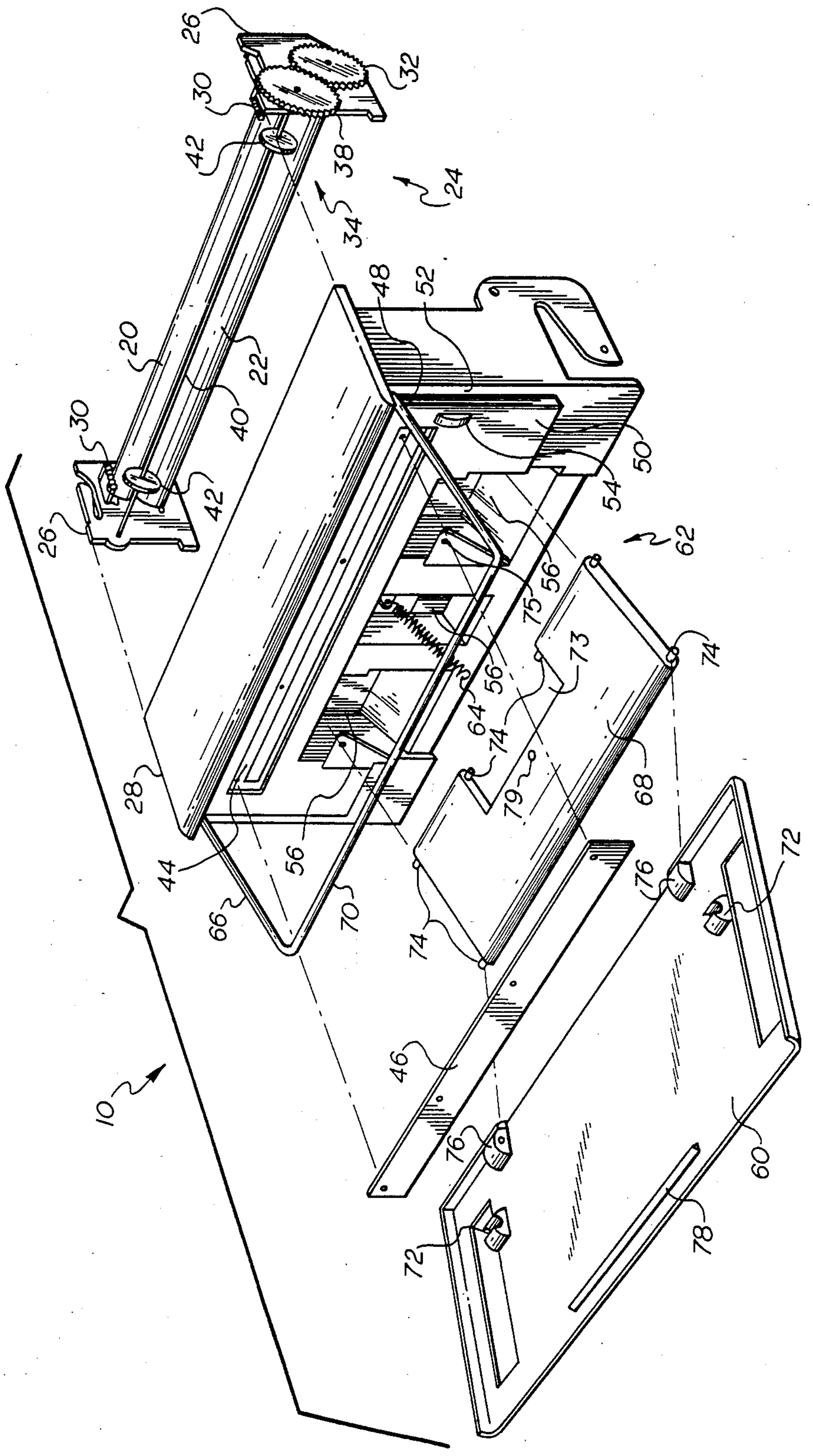
FIG. 2 is an exploded perspective of certain components forming the present invention.
Figure 3:
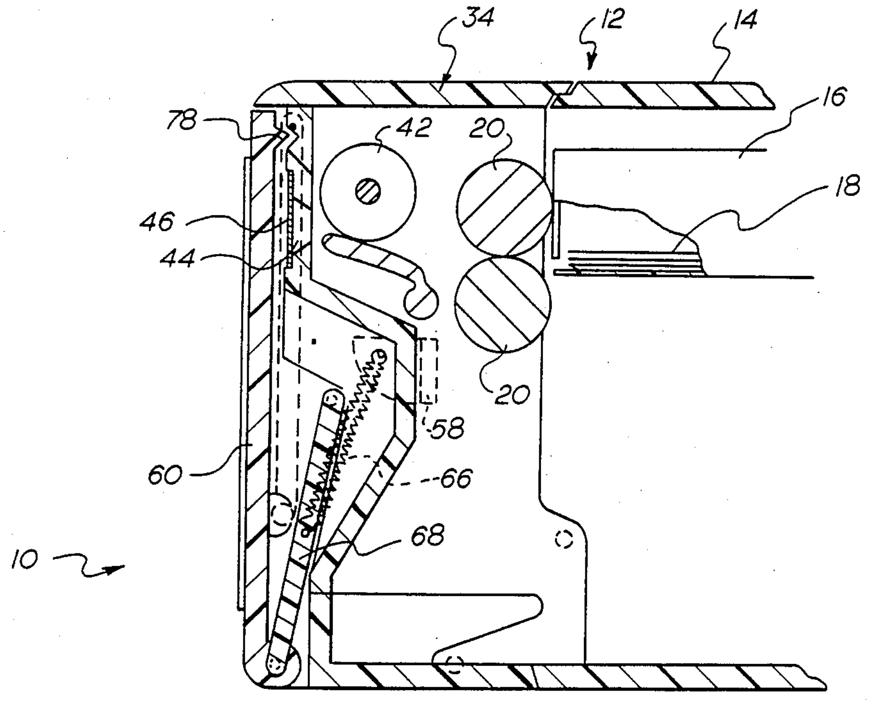
FIG. 3 is an enlarged fragmented and cross-sectional view showing components of the foldable catcher assembly in a collapsed condition; and, FIG. 4 is an enlarged fragmented and cross-sectional view similar to FIG. 3 but showing the components in an extended condition.
Figure 4:
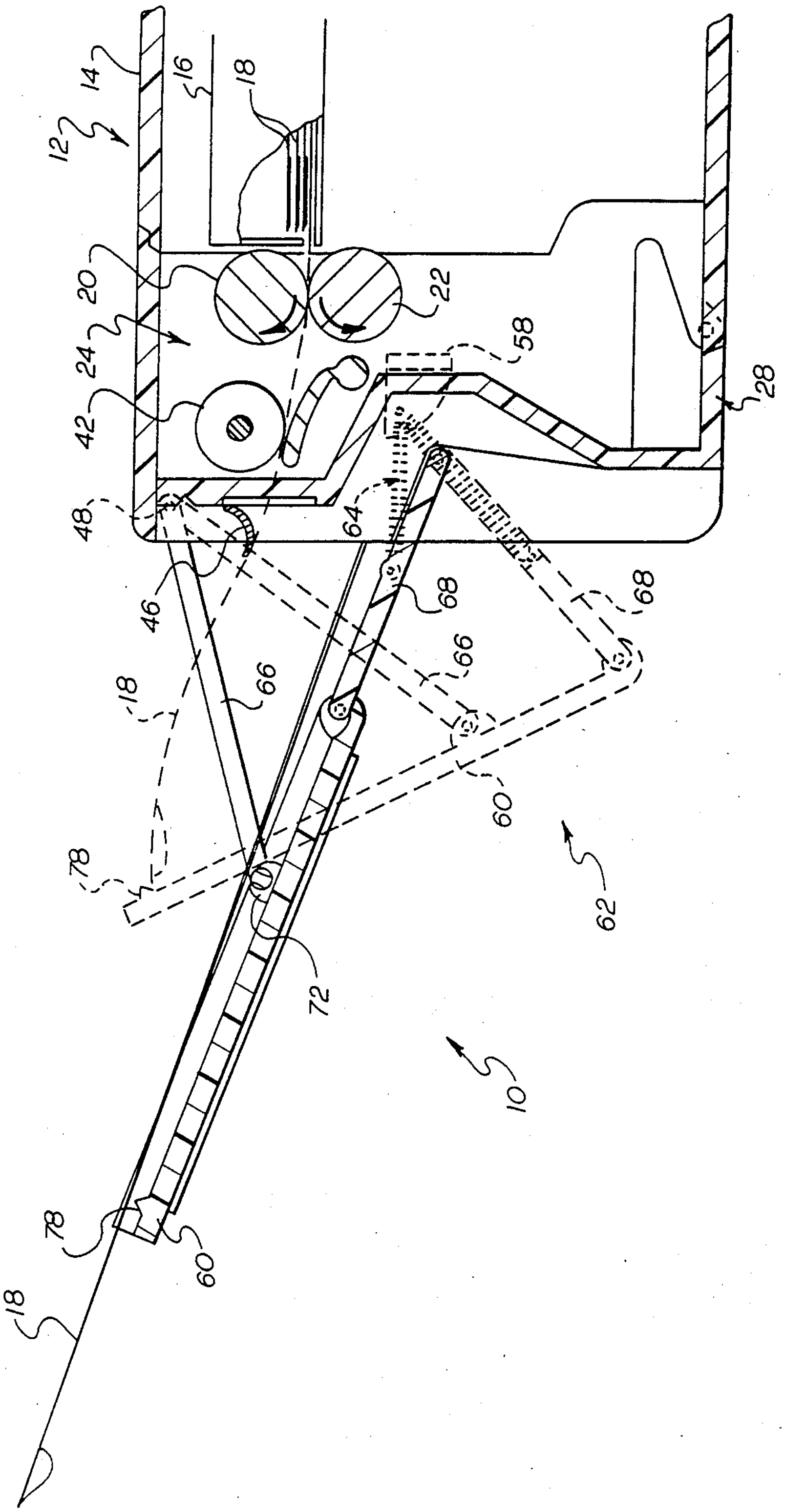

The front loading door 28 includes an elongated exit slot 44 through which the picked film units pass. A thin, rectangular and opaque cover member 46 is secured to a recess formed on the front loading door 28 so as to cover the exit slot 44 and block undesired light. The front loading door 28 has formed at the top thereof ledge stop surfaces 48 (FIGS. 2 and 4). These stop surfaces 48 are effective, in a manner to be described, for limiting swinging movement of the foldable film catcher assembly 10 to the extended condition. The front loading door 28 includes a pair of portions 50 which define elongated recesses 52 on opposed sides of the door 28. The recesses 52 define a limiting surface for the film catcher assembly 10 when the latter is in a collapsed condition. A protrusion 54 is formed to receive the drive gear 38. Also formed in the front loading door 28 is a plurality of recesses 56. An anchor 58 (FIG. 4) is connected to the door 28 and is accessible from a middle one of the recesses 56.

Reference is now made to the foldable film catcher assembly 10. The film catcher assembly 10 includes a film supporting member or bin door 60, a linkage assembly which is generally indicated by reference numeral 62 and an overcenter biasing spring or means 64.

The linkage assembly 62 includes a wire link member 66 and tray link 68. The wire link member 66 has a generally U-shaped configuration and has its opposite ends pivotally mounted to respective sides of the front loading door 28. Elongated bight portion 70 of the wire link 66 is pivotally received in mounting brackets 72 formed on the bin door 60. The tray link 68 is defined as a generally rectangular flat panel having a cut-out 73 and has a plurality of pintles 74 formed as shown. Some of the pintles 74 cooperate with openings 75 (two shown in FIG. 2) formed in the outermost pair of recesses 56 and allow pivotal movement of the tray link 68 relative to the front loading door 28. Brackets 76 formed integrally on the bin door 60 pivotally receive other pintles 74 of the tray link 68. Accordingly, the tray link 68 can pivot relative to the bin door 60 and the front housing door 28, whereby it can pivot from its collapsed upright condition (FIG. 3) to its extended position (FIGS. 1 and 4).

The bin door 60 is defined as a horizontal supporting panel member having adjacent a forward edge thereof an inclined projection or ramp 78 which is configured and positioned to engage the leading edge of at least the initial emerging film unit (see FIG. 4). Engagement of the ramp 78 by the exiting film unit 18 automatically moves the linkage assembly 62 from its collapsed (FIG. 3) to its extended (FIG. 4) condition. The emerging film unit 18 overcomes the biasing of the overcenter spring 64 which is attached at opposite ends to the anchor 58 and to an opening 79 in the tray link 68. In this manner the bin door 60 moves from its upright position (FIG. 3) to its extended position (FIG. 4). Accordingly, the foldable film catcher device 10 automatically opens by reason of the film unit itself. It will be appreciated that the film unit has sufficient beam strength for accomplishing the opening operation. During the foregoing extension, the tray link 68 moves upwardly from its generally vertical position (FIG. 3) past the overcenter position which is shown in dotted lines in FIG. 4 to the inclined position shown by solid lines in FIG. 4. Of course, once past the overcenter position, the overcenter spring 64 urges the bin door 60 to its extended and inclined position.

The tray link 68 and bin door 60 when extended, are generally parallel and juxtaposed such that both provide a support for the film unit or units 18. As the bin door 60 rotates beyond its overcenter position (see dotted line position in FIG. 4) to its fully extended position (see solid line position in FIG. 4), the leading edge of the emerging film unit 18 can travel over the ramp 78. The ramp 78 has an inclined surface which facilitates such overtravel.

However because of the linkage assembly 62, the ramp 78 is situated far enough from the front loading door 28 so that the film unit 18 after being ejected from the housing assembly 14 does not have its balance point extend beyond the ramp 78. If the film unit 18 were to have its balance point extend beyond the edge of the bin door 60, then the film unit would fall from the bin door. Towards insuring that the film unit 18 does not have its critical balance point extend beyond the bin door 60, the linkage assembly 62 has been provided so as to provide extension of the bin door 60 that would otherwise not be provided if the bin door 60 were directly hinged to the loading door 28.

For limiting movement of the linkage assembly 62 in the extended condition, the wire link member 66 engages the stop surfaces 48. Given the fact that the foregoing construction is of the four-bar linkage type, it will be appreciated that by stopping movement of any one of the links, movement of the entire linkage ceases. Therefore, the present invention envisions that instead of the loading door 28 with stop surfaces 48, the bin door 60 itself could be provided with a pair of surfaces which would engage respective ones of the bottom surfaces of the wire link member 66 to thereby limit the degree of swinging of the bin door.

Subsequent film units will be ejected onto the combination bin door 60 and tray link 68 whereby they can form a stacked arrangement (not shown) of film units.

In their angular orientation and openness, the bin door 60 and tray link 68 allow a user to pick out individual ones of the stacked film units, while keeping the stack in a supported relation.

Upon removal of all the film units 18 from the bin door 60, a user merely forces the bin door 60 towards the housing assembly 14 thereby collapsing the linkage assembly 62 and the bin door 60. The spring 64 will serve to automatically return the linkage assembly 62 to its collapsed condition after, of course, the bin door 60 passes the overcenter condition.

After having explained the above construction of the foldable film catcher assembly 10 in conjunction with the printer apparatus 12, it is believed that the operation of the former is self-evident. It should be noted that although the foldable film catcher assembly has been disclosed for use in conjunction with the printer apparatus 12 of the type disclosed herein, the present invention contemplates that the foldable film catcher assembly be appropriately attached to other devices which eject film units or other individual units having at least sufficient beam strength which upon emerging from such an apparatus would facilitate driving the bin door from its collapsed to its extended condition.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An apparatus for recording images on film units comprising:

a housing assembly having an exit slot which allows ejection of individual film units therefrom;

means disposed in said housing assembly for ejecting each film unit from said slot; and, a foldable image recording unit catcher assembly mounted on and exterior to said housing assembly adjacent said slot for automatically moving from a compact inoperative condition to an extended operative condition in response to engagement by a leading edge of the film unit emerging from said slot, wherein when in said operative condition, at least one unit from said slot is removably supported thereon and is presented to a user in a preselected orientation which facilitates removal thereof wherein said foldable assembly includes a film unit supporting member, said supporting member having a projection extending along a portion of said supporting member, said projection being constructed and arranged to catch the leading edge of an exiting film unit when said support member is in said compact condition so as to force said supporting member to said extended condition; said projection being constructed to allow a leading edge of the film unit to pass thereover as said supporting member moves from said compact to said extended condition.

2. The apparatus of claim 1 wherein:

said foldable assembly includes:

a film unit supporting member;

a linkage assemby which is pivotally connected to and between said supporting member and said housing assembly for allowing pivoting movement of said supporting member and itself between collapsed and extended conditions;

overcenter biasing means connected to and between said housing assembly and said linkage assembly for selectively biasing said supporting member and said linkage assembly to said collapsed or said extended conditions; and, means for limiting movement of said linkage assembly and thereby said supportng member so that a plurality of film units can be stacked in the preselected orientation.

3. The apparatus of claim 2 wherein:

said linkage assembly includes a generally U-shaped member and a tray member, said U-shaped member having opposite end portions pivotally mounted on and to opposing side portions of said housing assembly and a bight portion pivotally mounted on and adjacent an end portion of said supporting member, said tray member has a pivotal connection to said housing assembly and a pivotal connection to a portion of said supporting member adjacent said end portion, said U-shaped member and said tray member assuming generally vertical positions when said supporting member is in said collapsed condition whereby said slot is covered by said supporting member and said tray and U-shaped members assuming generally extended positions when said supporting member is in said extended condition.

4. The apparatus of claim 3 wherein:

said supporting member and said tray member are generally planar panels which when said catcher assembly is in said operative condition are generally juxtaposed in coplanar relationship with one another to support a plurality of stacked film units.

5. The apparatus of claim 3 wherein:

said limiting means is formed on said housing assembly and limits movement of said U-shaped member to said extendable condition.

6. The apparatus of claim 1 wherein:

said ejecting means includes means for frictionally driving each of the film units beyond said slot.

7. The apparatus of claim 4 wherein:

said supporting member and said tray member are arranged so that when in said extended condition, they support a sufficient length of each film unit so that a balance point of each film unit does not extend over a forwardmost edge of said supporting member when the latter is in said extended condition.

* * * * *